Aug. 13, 1968 P. K. WEIMER 3,397,325

SENSOR ARRAY COUPLING CIRCUITS

Filed Dec. 30, 1965 2 Sheets-Sheet 1

Inventor:
PAUL K. WEIMER

BY John V. Regan
Attorney

Aug. 13, 1968 P. K. WEIMER 3,397,325

SENSOR ARRAY COUPLING CIRCUITS

Filed Dec. 30, 1965 2 Sheets-Sheet 2

INVENTOR.
PAUL K. WEIMER
BY John V. Regan
Attorney

United States Patent Office 3,397,325

Patented Aug. 13, 1968

3,397,325

SENSOR ARRAY COUPLING CIRCUITS

Paul K. Weimer, Princeton, N.J., assignor to Radio Corporation of America, a corporation of Delaware Filed Dec. 30, 1965, Ser. No. 517,702
3 Claims. (Cl. 307—251)

ABSTRACT OF THE DISCLOSURE

A signal gating circuit having a complementary field-effect transistor pair having a control electrode connected to a source of a control signal for concurrently turning off one transistor and turning on the other transistor. The transistors are connected in series between a bias source and an output signal line while an input signal line is connected to the junction of the transistors.

*Background of the invention*

In televison camera tubes, a video output signal can be readily obtained by coupling a video amplifier to an electrode which is capacitively coupled to all the picture elements, with the scanning of the elements being achieved by a scanning electron beam. In a solid state pattern sensor comprising a plurality of light sensitive elements arranged in grid form, the electron beam is replaced by elemental diodes or triodes arranged as switch devices in series with the sensing elements. The commutating of the diodes or triodes is performed by horizontal and vertical scan generators arranged to scan the rows and columns of the sensor grid. However, the shunt capacitance across the switch elements of the grid is large enough to degrade the signal-to-noise ratio of the grid output signal if an output amplifier is coupled to all the elements simultaneously. Thus, a high signal-to-noise ratio can be obtained only if the amplifier is connected to one line at a time as each sensor element is sequentially selected.

*Summary of the invention*

An object of the present invention is to provide an improved signal coupling and selecting circuit.

Another object of the present invention is to provide an improved high speed signal selecting circuit for selectively coupling an input signal to an output line.

A further object of the present invention is to provide an improved signal coupling circiut for sequentially coupling each of a plurality of input signals to a common output signal line while blocking the remaining input signals.

Still another object of the present invention is to provide an improved coupling circuit for a sensor array to selectively couple output signals from the array to a common output line.

In accomplishing these and other objects, there is provided, in accordance with the present invention, a novel signal coupling and selecting circuit comprising a first signal gating means arranged to back-bias an input signal line to oppose an input signal thereon, a second signal gating means arranged to connect an input signal line to a common output line, and gating control means operative to alternately turn off said first means and turn on said second means to effect a transfer of a signal from the input line to the output line.

*Brief description of the drawing*

A better understanding of the present invention may be had when the following detailed description is read in connection with the accompanying drawings, in which.

*Description of the preferred embodiment*

Figure 1:
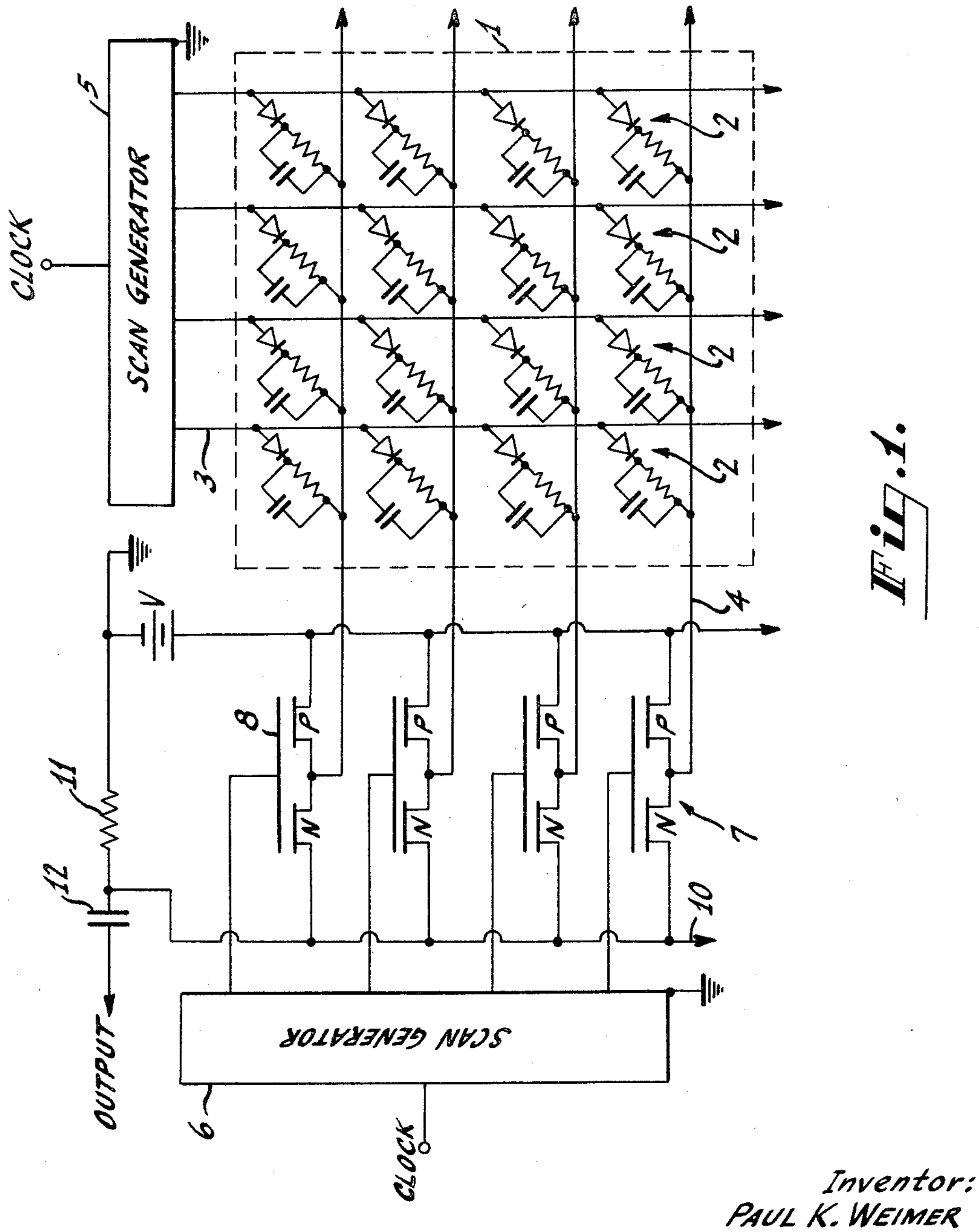
FIGURE 1 is a schematic illustration of a signal gating circuit embodying the present invention.

Referring to FIGURE 1 in more detail, there is shown an image panel having an array of photosensitive elements 2. Two types of image sensing elements 2 are available with the difference between them arising from their thin-film technique construction. They can be designated either as "charge storage" or "excitation storage." Each sensor element 2 consists of a discrete deposited photoconductor element in series with diode. The shunt capacitance across the photoconductive element in charge storage operation should be sufficiently large to hold a charge throughout the period from one array scan cycle the next. This mode of operation permits utilization of all the photocurrent produced by light falling on an element throughout the entire period between scans and is most useful when maximum sensitivity at a first scan is required. On the other hand, in excitation storage, the capacitance should be as small as possible since the photocurrent is used only during the instant of scan. However, internal excitation of the photoconductor is provided to effect a signal integration of the light falling on the element between scans. This type of operation would be useful at slow scanning rates which would prevent proper operation of the charge storage.

The panel 1 has horizontal address lines 3 and vertical address lines 4 with the sensing elements 2 being arranged to bridge the lines 3 and 4 at each intersection. The lines 3 and 4 are sequentially scanned by separate scan generators 5, 6. The scan generators 5, 6 may be any suitable device for producing a sequence of individually energized output lines to select each of the sensing elements 2.

A suitable scan generator circuit is shown in the October-November 1964 issue of the RCA Engineer, identified as vol. 10, No. 3, on pp. 52 to 54 in an article entitled "A Completely Integrated Thin-Film Scan Generator for Crossed-Array Image Panels" by P. K. Weimer et al.

The vertical lines 3 are individually connected to the output lines of the first scan generator 5. The horizontal lines 4 are each connected to a gating circuit 7 driven by the second scan generator 6. The gating circuit 7 comprises a complementary field-effect transistor, such as a thin-film transistor or a metal-oxide-semiconductor (MOS), 8 for each horizontal line 4. The gate electrode of each MOS device 8 is connected to a corresponding output line of the second scan generator 6. The drain electrodes of each pair of the MOS devices are connected together and to one of the horizontal lines 4. The source electrode of each of the P-type MOS devices is connected to the positive side of a voltage source V. The other side of the source V is connected to ground. The source electrode of each of the N-type MOS devices is connected to a common output line 10 which line, for purposes of illustration, is connected to ground through a load resistor 11. An output coupling capacitor 12 is used to connect the line 10 to an output terminal.

In operation, the sensing elements 2 are selected by advancing the first scan generator 5 along a horizontal line selected by the second scan generator 6. The horizontal line is selected by generator 6 by having all the P-type MOS devices turned on except on the selected line. Thus, the unselected horizontal lines are connected to the source V to back-bias the diodes of each of the attached sensing elements 2. The selected horizontal line is connected by the conducting N-type MOS device to the load resistor 11. The horizontal line is then scanned by the first scan generator 5 with each diode on the selected horizontal line being switched "on" in sequence to deliver a signal to the load resistor 11 depending on the resistance of the corresponding photoconductive element. Since this resistance is dependent on the light energy incident thereon, the signal across the resistor 11 is a representation of the light pattern "seen" by each element in the panel 1. The coupling gate circuit 7 has significant advantages in minimum power drain and elimination of unwanted currents in the output circuit.

Figure 2:
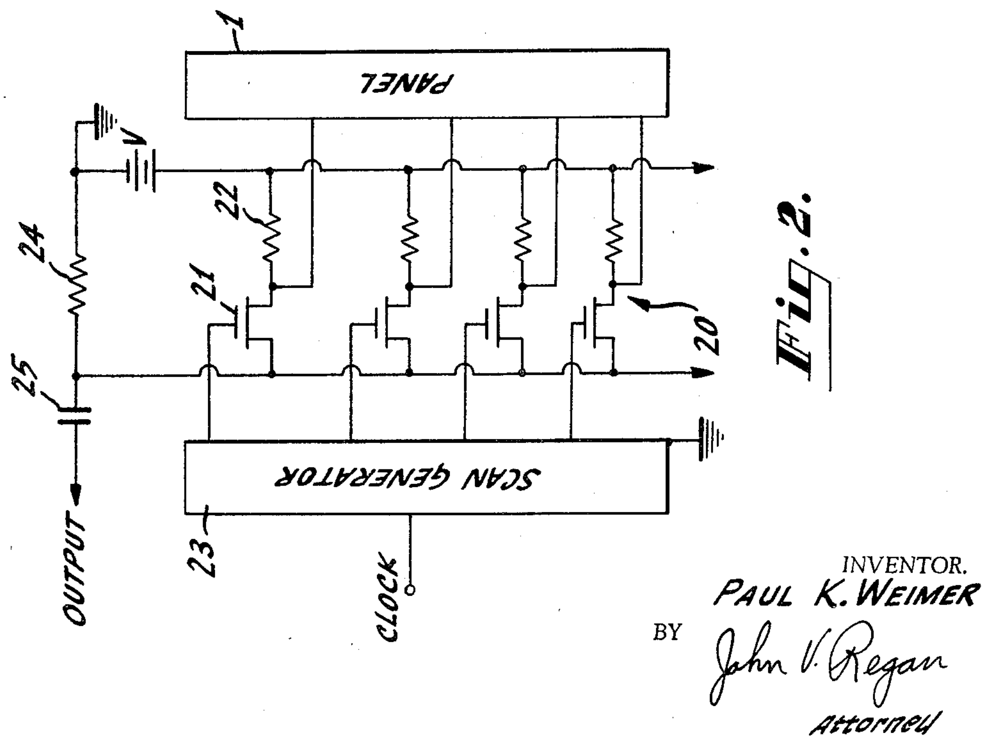
FIGURE 2 is a schematic illustration of a modification of the signal gating circuit shown in FIGURE 1 and, also, embodying the present invention.

A coupling cirsuit 20, also, embodying the present invention is shown in FIGURE 2 with a simplified structure over the embodiment described above and shown in FIGURE 1. The complementary pair MOS devices 8, shown in FIGURE 1, are each replaced by a single MOS transistor and a resistor, e.g., transistor 21 and resistor 22. The gate electrodes of the MOS transistors are driven by a vertical scan generator 23. The output signals from the sensing elements of the panel 1 selected by a horizontal scan generator (not shown) are applied across an output resistor 24 and coupled to an output terminal by a coupling capacitor 25. The non-selected sensing elements in the panel 1 are back-biased by a source V connected to each horizontal line through the resistors of the coupling circuit 20. This back-bias is defeated by the signal from the generator 23 sequentially turning on the MOS transistors. The further operation of this embodiment is similar to that described above with respect to FIGURE 1.

Figure 3:
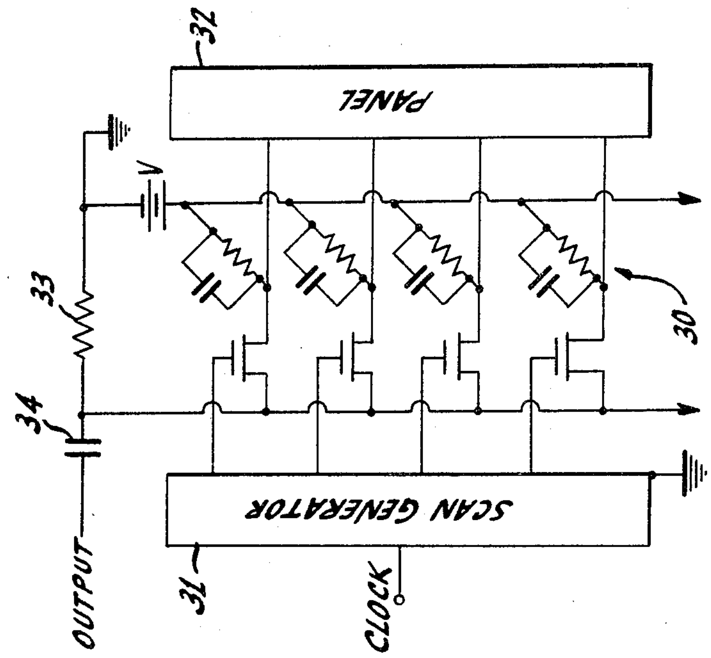
FIGURE 3 is a schematic illustration of another embodiment of the present invention using further modification of the circuit shown in FIGURE 1.

In FIGURE 3, there is shown still another embodiment of the present invention using a column of the panel sensing elements (shielded from any light source) to provide part of a gating circuit 30. The operation of this embodiment is similar to that shown in FIGURE 2 with the sensing elements replacing the resistors of the coupling circuit 20 shown in FIGURE 2. Here, the MOS transistors are sequentially turned on by a vertical scan generator 31 to connect an output signal from a panel 32 to a load resistor 33 and a coupling capacitor 34. The diodes of the non-selected elements in panel 32 are back-biased by a source V. It is to be noted that the coupling circuits of the present invention, also, may be said to couple signals into the panel 1 to energize display elements, such as electroluminescent elements, to provide a display panel.

Accordingly, it may be seen that there has been presented, in accordance with the present invention, an improved signal gating circuit for coupling individual input signal lines to a common output line.

What is claimed is:

1. A signal coupling comprising first means for selectively connecting an input signal to an output line, second means for supplying an opposing signal to said input signal, circuit means connecting an input signal to said first and said second means, and scan means arranged to provide an output signal to energize said first means into a conducting state and to simultaneously defeat the effect of said second means, wherein said first and second means includes a complementary pair of field-effect transistor devices having a common gate electrode connection to said output signal from said scan means.

2. A signal coupling circuit as set forth in claim 1, wherein said first means is an MOS transistor having a gate electrode connected to said output signal from said scan means and said second means includes a serial arrangement of a voltage source and a resistor connected to oppose an input signal to said first means.

3. A signal coupling circuit as set forth in claim 1, wherein said first means is an MOS transistor having a gate electrode connected to said output signal from said scan means and said second means is a diode and a voltage source connected in series and arranged to oppose an input signal to said first means.

References Cited

UNITED STATES PATENTS 2,964,657 12/1960 Page .............. 307—88.5

JOHN S. HEYMAN, *Primary Examiner.*